UNITED STATES PATENT OFFICE.

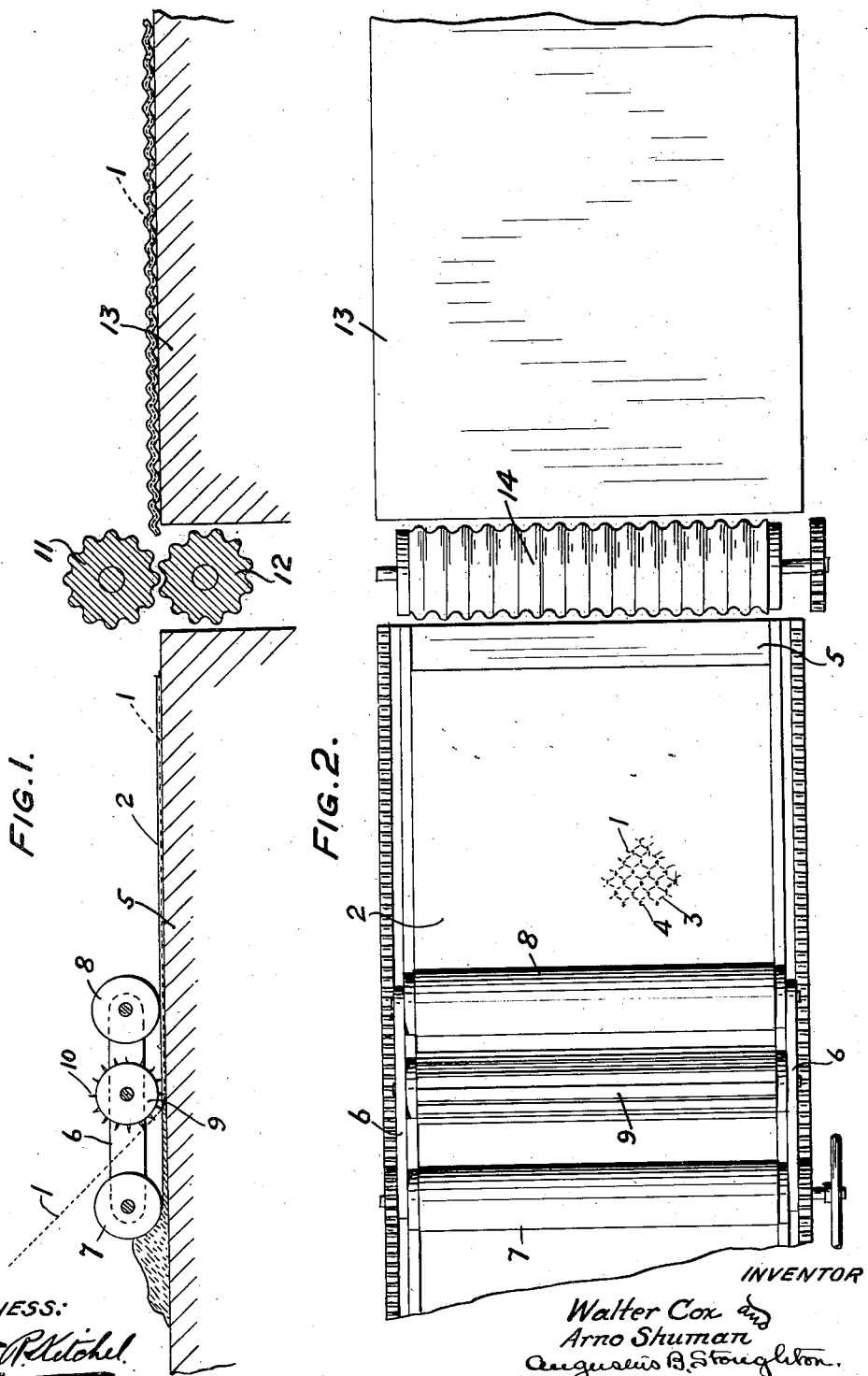

WALTER COX AND ARNO SHUMAN, OF PHILADELPHIA, PENNSYLVANIA, ASSIGNORS TO PENNSYLVANIA WIRE GLASS COMPANY, OF PHILADELPHIA, PENNSYLVANIA, A CORPORATION OF NEW JERSEY.

PROCESS OF MAKING CORRUGATED WIRE GLASS.

1,418,236.  Specification of Letters Patent.  Patented May 30, 1922.

Application filed December 14, 1920. Serial No. 430,643.

*To all whom it may concern:*

Be it known that we, WALTER COX and ARNO SHUMAN, citizens of the United States, residing at Philadelphia, in the county of Philadelphia and State of Pennsylvania, have jointly invented a new and useful Process of Making Corrugated Wire Glass, of which the following is a specification.

The principal object of the present invention is to provide a simple, expeditious and comparatively inexpensive method of making corrugated wire glass.

To this and other ends hereinafter set forth, the invention comprises the method of making corrugated wire glass which consists in rolling a flat sheet of wire glass with mesh having twists adapted to tighten to increase the distance between them, and while the sheet is hot from its initial heat, and with or without the application of additional heat, corrugating the sheet and tightening the twists.

In the drawings there is illustrated the practice of the method by certain mechanisms suitable for that purpose, and in the drawings—

Figure 1, is a diagrammatic view, principally in vertical section, and

Fig. 2, is a similar view in plan showing a modification.

In the drawings the wire mesh 1 which is embedded in the glass 2, consists of strands 3 united by twists 4, and these twists by tightening are adapted to elongate or let out the strands sufficiently to permit the sheet of wire glass to assume corrugated form without serious displacement of the mesh as will be clear from the following description. A sheet of wire glass is rolled on the table 5, for example, by means of a carriage 6 having smooth leading and following rolls 7 and 8, and an intermediate roll 9 having projections 10 for embedding the wire mesh in the sheet of glass. The sheet of wire glass, while retaining its initial heat, or some of it, and with or without additional heating, is subjected to a corrugating operation which is successfully accomplished because the glass is more or less plastic and the twists in the mesh by tightening under the corrugating operation let out or elongate the strands between the twists and thus provide for the necessary extension. In Fig. 1 the corrugation is effected by passing the described sheet of wire glass between axially ribbed rolls 11 and 12 onto the table 13 and in Fig. 2 the corrugation is effected by passing the described sheet of wire glass between a pair of radially ribbed rolls of which the top one 14, appears in Fig. 2, and of which the bottom one is directly under the top one and therefore concealed by it. While one pair of corrugated rolls is shown, it must be understood that more than one pair may be employed and in such case the corrugation is accomplished in stages, however since this is a duplication of pairs of rolls no illustration is required in order to understand it.

We claim:

1. The method of making corrugated wire glass which consists in rolling a flat sheet of wire glass with mesh having twists adapted to tighten to increase the distance between them, and while the sheet retains some of its initial heat corrugating the sheet and tightening the twists, substantially as described.

2. The method of making corrugated wire glass which consists in rolling a flat sheet of wire glass with mesh having twists adapted to tighten to increase the distance between them, and while the sheet retains some of its initial heat corrugating the sheet and tightening the twists by passing it between corrugated rollers, substantially as described.

WALTER COX.
ARNO SHUMAN.